(12) United States Patent
Horley et al.

(10) Patent No.: US 8,510,356 B2
(45) Date of Patent: Aug. 13, 2013

(54) IDENTIFIER SELECTION

(75) Inventors: John Michael Horley, Cambridge (GB); Andrew Brookfield Swaine, Cambridge (GB); Michael John Williams, Cambridgeshire (GB)

(73) Assignee: ARM Limited, Cambridge (GB)

( * ) Notice: Subject to any disclaimer, the term of this patent is extended or adjusted under 35 U.S.C. 154(b) by 714 days.

(21) Appl. No.: 12/659,669

(22) Filed: Mar. 16, 2010

(65) Prior Publication Data

US 2011/0231461 A1 Sep. 22, 2011

(51) Int. Cl.
*G06F 7/00* (2006.01)
(52) U.S. Cl.
USPC .......................................................... 708/211
(58) Field of Classification Search
USPC .......................................................... 708/211
See application file for complete search history.

(56) References Cited

U.S. PATENT DOCUMENTS

| 4,748,575 A | * | 5/1988 | Ashkin et al. ................. 708/211 |
| 6,173,300 B1 | * | 1/2001 | Mahurin ....................... 708/211 |
| 6,381,622 B1 | * | 4/2002 | Lie ................................. 708/211 |

* cited by examiner

*Primary Examiner* — Tan V. Mai
(74) *Attorney, Agent, or Firm* — Nixon & Vanderhye P.C.

(57) ABSTRACT

A data processing apparatus is provided which is configured to select $2^M$ selected identifiers within a possible range of up to $2^N$ identifiers, where $M \leq N$. The data processing apparatus comprises a selection storage unit configured to store N+1 identifier selection bits, wherein a position of a marker bit in the N+1 identifier selection bits determines M, and an identifier selection unit configured to determine the $2^M$ selected identifiers. The $2^M$ selected identifiers are defined by a base identifier and $2^M-1$ identifiers incrementally following that base identifier. N−M bits of the N+1 identifier selection bits form N−M most significant bits of the base identifier, and M trailing zeroes form the M least significant bits of the base identifier.

20 Claims, 5 Drawing Sheets

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| b | b | b | b | b | b | b | b | b | b | b | b | b | b | b | b | 1 |

↳ Single event bbbb_bbbb_bbbb_bbbb is selected

FIG. 3A

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| b | b | b | b | b | b | b | b | b | b | b | 1 | Ø | Ø | Ø | Ø | Ø |

↳ 32 events from bbbb_bbbb_bbbØ_ØØØØ to bbbb_bbbb_bbb1_1111 selected

FIG. 3B

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | Ø | Ø | Ø | Ø | Ø | Ø | Ø | Ø | Ø | Ø | Ø | Ø | Ø | Ø | Ø | Ø |

↳ All events selected

FIG. 3C

IDENTIFIER SELECTION

BACKGROUND OF THE INVENTION

1. Field of the Invention

The present invention is concerned with the selection of a subset of identifiers from within a range of identifiers. In particular the present invention is concerned with the selection of $2^M$ identifiers within a range of up to $2^N$ identifiers, where M is less than or equal to N.

2. Description of the Prior Art

There may be various situations in which it is required to select a subset of identifiers from a range of identifiers, for example in a tracing unit which monitors the activity of a processor core, the processor core may be configured to issue data indicative of its activities to the tracing unit over a number of different channels. In such a situation, it may be desired to filter those channels, so that only a subset of all possible channels are actively monitored and have their associated information converted into a trace stream for output. Another such situation is the use of a large number of addresses, where it is desired to monitor only a subset of those addresses, for example in a watchpoint unit embedded within a processor core. Typically such identifiers are defined by a sequence of bits, such that up to $2^N$ identifiers may be defined by N bits.

In order to select a subset of identifiers (e.g. the above mentioned channel or addresses) various techniques are known. For example, it is known to configure a register to define an identifier of interest, such that when use of that identifier occurs a match with the identifier as defined in the register may trigger a suitable response. More generally, it is known to provide a number of such registers corresponding to a number of identifiers of interest, such that when any of those identifiers are used the corresponding response may be triggered. However, this approach has the disadvantage that if a large number of identifiers form the subset of interest it will be necessary to provide a corresponding large number of registers defining those selected identifiers. In other words, this approach can be expensive to implement in hardware.

It is also known to select a range of identifiers by defining a starting identifier and an end identifier, using a register for each, wherein any identifier falling within the range spanned by the start identifier and end identifier is selected. However, this approach not only requires two registers of equal size to the identifier space to identify the upper and lower limit, but also further and more complex comparison units configured to determine if a given identifier falls within the range. In other words, this approach can be expensive to implement in hardware.

It is also known to select a range of identifiers by defining a base identifier and a window size, for example a N-bit base identifier and a $\log_2(N)$ bit window size. However, this approach requires a configuration register for each, and further logic to determine if a given identifier falls within the defined window. In other words, this approach can be expensive to implement in hardware.

In some situations where such a subset of identifiers is required to be monitored, for example in system-on-chip (SoC) arrangement, space may be at a premium, and consequently it is desirable to be able to define and identify the subset of identifiers as efficiently as possible.

Hence it would be desirable to provide an improved manner of efficiently selecting a subset of identifiers from within a possible range of up to $2^N$ identifiers.

SUMMARY OF THE INVENTION

Viewed from a first aspect, the present invention provides a data processing apparatus configured to select $2^M$ selected identifiers within a possible range of up to $2^N$ identifiers, where $M \leq N$, said data processing apparatus comprising: a selection storage unit configured to store N+1 identifier selection bits, wherein a position of a marker bit in said N+1 identifier selection bits determines M; and an identifier selection unit configured to determine said $2^M$ selected identifiers, wherein said $2^M$ selected identifiers are defined by a base identifier and $2^M-1$ identifiers incrementally following said base identifier, wherein N−M bits of said N+1 identifier selection bits form N−M most significant bits of said base identifier, and M trailing zeroes form M least significant bits of said base identifier.

For a configuration in which there are up to $2^N$ possible identifiers, a selection storage unit is provided which stores N+1 identifier selection bits. For example, where the range of possible identifiers comprises $2^8$ identifiers, the selection storage unit is configured to store 9 identifier selection bits. Within the N+1 identifier selection bits, the position of a marker bit determines M, and hence the selected identifiers, in particular defining a base identifier and (where appropriate) a number of identifiers incrementally following that base identifier. The position of the marker bit in the N+1 identifier selection bits determines M, and this defines there to be $2^M$ selected identifiers defined by a base identifier and $2^M-1$ identifiers incrementally following that base identifier. The base identifier is defined by N−M bits of the N+1 identifier selection bits providing the N−M most significant bits of the base identifier, followed by M trailing zeroes as the M least significant bits of the base identifier. For example, when N=8 and the marker bit indicates that M=5, three bits of the 9 identifier selection bits form the most significant bits of the base identifier with 5 trailing zeros forming the five at least significant bits of the base identifier. The $2^5$ selected identifiers are defined by this base identifier and the $2^5-1$ identifiers incrementally following that base identifier.

The inventors of the present invention realised that by the provision of only N+1 identifier selection bits, a very efficient encoding of $2^M$ selected identifiers within the possible range of up to $2^N$ identifiers (where M is less then or equal to N) could be provided. Furthermore the possible subsets of selected identifiers can be flexibly defined. On the one hand only a single identifier may be selected, when the marker bit position in the N+1 identifier selection bits indicates that M=0, such that N bits of the N+1 identifier selection bits form the N most significant bits of the base identifier and no trailing zeros follow (i.e. the identifier selection bits provide all bits of the base identifier). Consequently $2^0-1$ (i.e. no) identifiers incrementally follow this base identifier. Conversely all possible identifiers may be selected by setting the marker bit in said N+1 identifier selection bits to indicate M=N, such that no bits of the N+1 identifier selection bits form the most significant bits of the base identifier, and the base identifier consists of all trailing zeros (i.e. the lowest possible base identifier consisting of all zeros). All possible identifiers are then selected since the base identifier is followed by $2^N-1$ identifier incrementally following the base identifier (i.e. $2^N$ identifiers in total). It will be recognised that implementations in which there are exactly $2^N$ identifiers (in other words an exact power of 2) from which the $2^M$ selected identifiers can be selected may be viewed as the simplest to construct. Nevertheless embodiments of the present invention may have fewer than $2^N$ identifiers from which the $2^M$ selected identifiers can be selected.

It will be recognised that the usage of bits within the N+1 identifier selection bits could be arranged in many different arbitrary ways, but according to one embodiment said N−M bits of said N+1 identifier selection bits comprise N−M most significant bits of said N+1 identifier selection bits. Using the N−M most significant bits of the N+1 identifier selection bits provides a conveniently direct translation, wherein this set of most significant bits of the identifier selection bits translate directly into the same set of most significant bits of the base identifier.

It will also be recognised that the usage of bit positions within the N+1 identifier selection bits to indicate M could be arranged in many different arbitrary ways, but in some embodiments said marker bit is stored at bit M of said N+1 identifier selection bits. It will be understood that the usual terminology of "bit M" of a given value is used here, where bit 0 up to bit N of an N+1 bit value may be specified, e.g. where there are $2^8$ identifiers, 9 identifier selection bits are provided, numbered from 0 up to 8.

It will be recognised that the selection of $2^M$ selected identifiers within a possible range of up to $2^N$ identifiers could take place in many different contexts, but in one embodiment said data processing apparatus comprises a tracing unit configured to provide trace information indicative of activity of a processor core. Within a tracing unit providing trace information indicative of the activity of a processor core it is typical that space is at a premium, and an efficient coding such as that provided by the present invention is particularly advantageous. Furthermore, such a tracing unit may be configured to in principle monitor a large number of possible identifiers, whilst in practice it is advantageous (for example to avoid overloading the limited bandwidth of the trace stream generated) to identify a subset of identifiers.

In such a tracing unit, in one embodiment said up to $2^N$ identifiers comprise channels via which said processor core can pass said trace information to said tracing unit. The use of up to $2^N$ channels over which the processor core can pass trace information to the tracing unit provides an advantageous mechanism by which trace information can be associated with many different sources, for example different processes executing on the processor core.

In other embodiments said up to $2^N$ identifiers are a range of address locations. In such embodiments said data processing apparatus may comprise an address monitoring unit configured to monitor use of said range of addresses. In a data processing apparatus it may be required to monitor a subset of addresses from within a large range of possible addresses, and the techniques of the present invention provides a particularly efficient manner of selecting such a subset. An address monitoring unit could take a number of forms, but in one embodiment said address monitoring unit is a watchpoint unit in a processor core. Within the processor core an efficient definition of a subset of addresses of interest is particularly beneficial, to avoid using up valuable space within the core. It will be appreciated that the range of address locations could be variously configured. In one embodiment said range of address locations is addresses of bytes of memory. In another embodiment said range of address locations is addresses of words of memory.

In other embodiments said data processing apparatus comprises a bus transaction monitoring unit configured to monitor use of a range of bus transaction identifiers, and wherein said up to $2^N$ identifiers comprise said range of bus transaction identifiers. There may be a large number of identifiers used to identify particular transactions, and the present invention provides an efficient mechanism for defining a subset of those bus transaction identifiers which may be desired to be monitored.

It will be appreciated that the selection storage unit could take a number of forms, but according to one embodiment said selection storage unit comprises an N+1 bit register. This provides an easily implemented mechanism for defining and storing the identifier selection bits.

It will be recognised that the particular choice of meaning of bits within the identifier selection bits is arbitrary, and in some embodiments said marker bit comprises a logical one, whereas in other embodiments said marker bit comprises a logical zero.

In one embodiment, said data processing apparatus is configured to identify said marker bit at a least significant bit position of said N+1 identifier selection bits in which a predetermined value is stored. Hence to identify the position of the marker bit the data processing apparatus need simply examine each bit of the N+1 identifier selection bits in order of increasing bit significance until that predetermined value is first encountered.

It will be recognised that the data processing unit could be configured in a number of ways, but in one embodiment said data processing unit comprises a mask generator, two bit-wise AND units and a comparator configured to compare the output of said two bit-wise AND units. In some such embodiments, said mask generator is configured to generate a N-bit mask value from said N+1 identifier selection bits and a first bit-wise AND unit is configured to perform a bit-wise AND operation on said N-bit mask value and N bits of said N+1 identifier selection bits. Further, in some such embodiments, a second bit-wise AND unit is configured to perform a bit-wise AND operation on said N-bit mask value and an N-bit candidate identifier.

Viewed from a second aspect the present invention provides a data processing apparatus configured to select $2^M$ selected identifiers within a possible range of up to $2^N$ identifiers, where M≦N, said data processing apparatus comprising: selection storage means for storing N+1 identifier selection bits, wherein a position of a marker bit in said N+1 identifier selection bits determines M; and identifier selection means for determining said $2^M$ selected identifiers, wherein said $2^M$ selected identifiers are defined by a base identifier and $2^M-1$ identifiers incrementally following said base identifier, wherein N−M bits of said N+1 identifier selection bits form N−M most significant bits of said base identifier, and M trailing zeroes form M least significant bits of said base identifier.

Viewed from a third aspect the present invention provides a method of a method of selecting $2^M$ selected identifiers within a possible range of up to $2^N$ identifiers, where M≦N, said method comprising the steps of: providing N+1 identifier selection bits; setting a marker bit at a position in said N+1 identifier selection bits to determine M; and reading said N+1 identifier selection bits, wherein said $2^M$ selected identifiers are defined by a base identifier and $2^M-1$ identifiers incrementally following said base identifier, wherein N−M bits of said N+1 identifier selection bits form N−M most significant bits of said base identifier, and M trailing zeroes form M least significant bits of said base identifier.

BRIEF DESCRIPTION OF THE DRAWINGS

The present invention will be described further, by way of example only, with reference to embodiments thereof as illustrated in the accompanying drawings, in which:

FIGS. 3A-3C illustrate different event selections in one embodiment;

DESCRIPTION OF THE PREFERRED EMBODIMENTS

Figure 1:
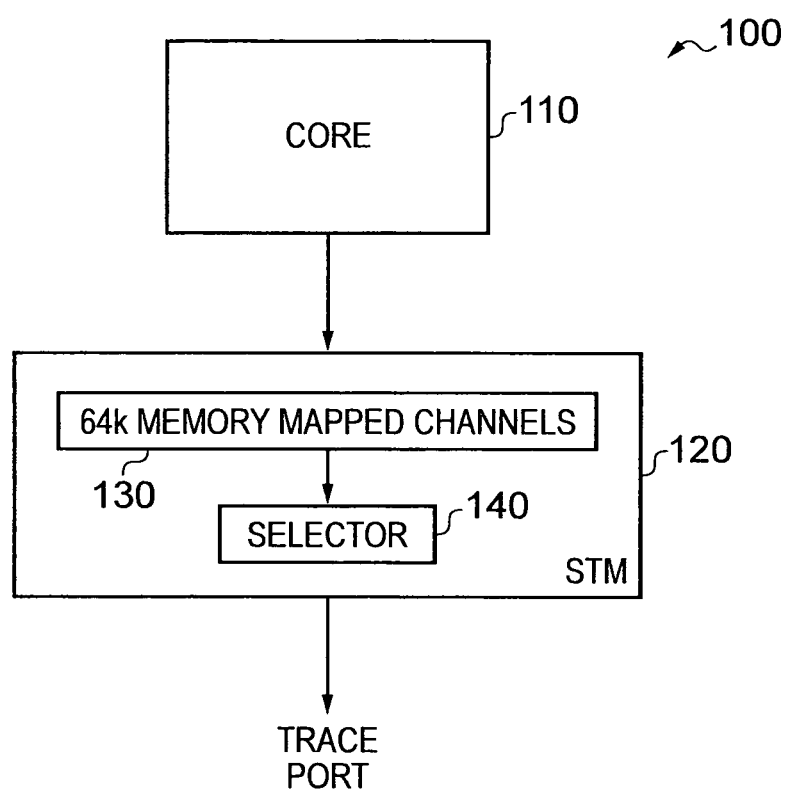
FIG. 1 schematically illustrates a tracing unit generating a trace stream in dependence on the activity of a processor core.

FIG. 1 schematically illustrates a data processing system 100 in which a processor core 110 passes information indicative of its processing activities to a tracing unit 120. The tracing unit "STM" 120 can receive the information from processor core 110 over 65,536 ($2^{16}$) memory mapped channels 130. The processor core 110 is configured to issue information to STM 120 via a particular channel, to indicate the source of that information. For example a particular channel (or channels) may be allocated to a particular process executing on processor core 110, such that information received over that channel (or channels) is known to be associated with that particular process. STM 120 further comprises a selector 140 which is configured to identify a subset of the memory mapped channels, such that not all channels are continuously monitored, but at any given time only that defined subset are monitored and the information received via those channels in that subset is used to generate the trace stream passed to the trace port.

Figure 2A:
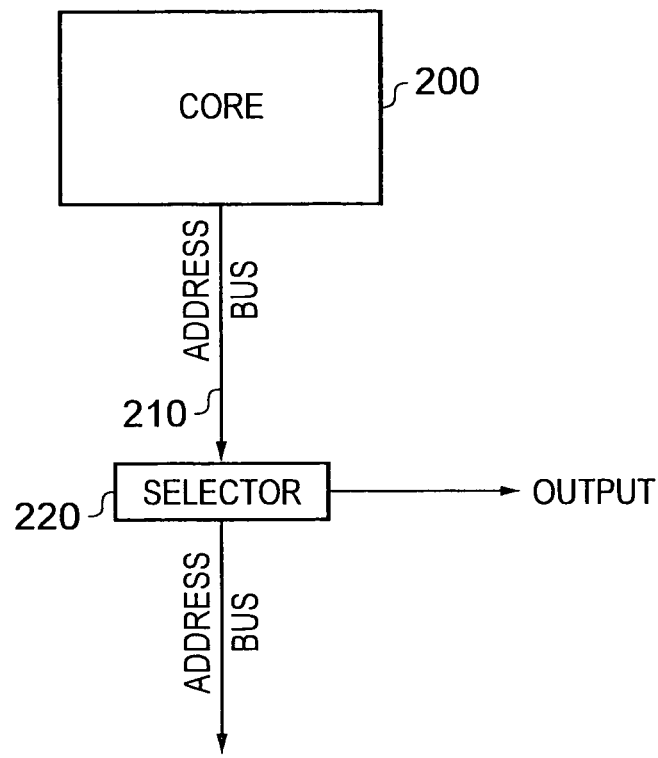
FIG. 2A schematically illustrates a selector monitoring particular addresses used on an address bus by a processor core.

FIG. 2A schematically illustrates a processor core 200 which is connected to an address bus 210. The processor core 200 makes use of the address bus 210, for example to specify memory locations it wishes to access. Selector 220 is configured to watch address bus 210 and to output information when any one of a particular subset of the addresses used on address bus 210 are used. A possible range of up to $2^N$ addresses can be used on address bus 210, and the selector 220 is configured to monitor a subset of $2^M$ addresses, where M is less than or equal to N. In the illustrated embodiment the addresses could for example be addresses of bytes of memory or alternatively could be addresses of words of memory.

Figure 2B:
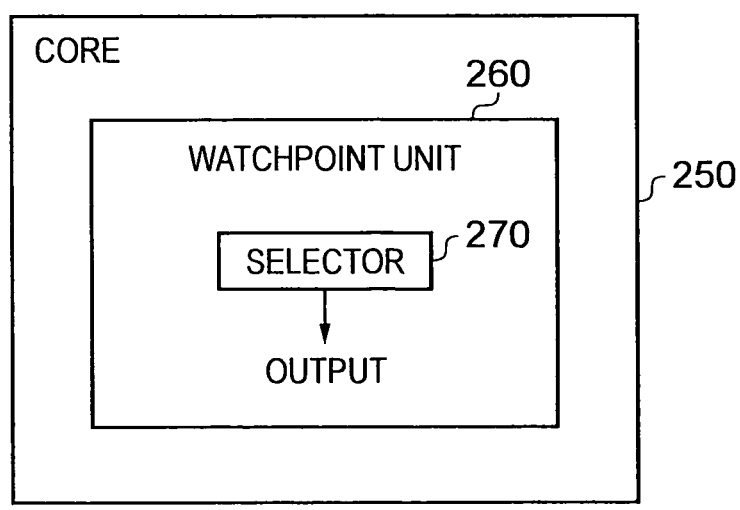
FIG. 2B schematically illustrates a watchpoint unit within a processor core.

FIG. 2B schematically illustrates a processor core 250 comprising a watchpoint unit 260, which is configured to monitor addresses used by the processor core 250. Within watchpoint unit 260, selector 270 is configured to monitor a subset of $2^M$ addresses within a possible range of up to $2^N$ addresses, where M is less than or equal to N, and to output information when that subset is used.

FIGS. 3A, 3B and 3C illustrate how different sets of events may be selected in an embodiment such as that illustrated in FIG. 1 from the 65,536 memory mapped channels available. The selector 140 is configured to monitor only a subset, and this is performed as is schematically illustrated in FIG. 3A-3C. The 65,536 channels correspond to 65,536 events that may be "selected events", wherein a particular event is specified by an identifier having 16 bits. Within selector 140 there is a selection storage unit which comprises a 17-bit register. In particular, the position of a marker bit within this 17-bit register determines the event or events that will be selected by selector 140. The bit in which the marker bit is stored is defined as the lowest bit position at which a logical one is stored. Note that the choice of use of one and zero in any given embodiment is clearly arbitrary and thus the particular bit implementation described with reference to FIGS. 3A-3C could trivially be inverted.

FIG. 3A thus illustrates a situation which the marker bit is stored in bit zero of the register, this being the lowest bit of position at which a one is stored. Note that the notation "b" indicates that either a one or a zero could be stored at this position (the particular choice defining the single event to be selected). In the arrangement illustrated in FIG. 3A since the marker bit is stored at bit zero of the register, bits 16 down to 1 of the register determine the single event that will be selected.

According to the arrangement illustrated in FIG. 3B the marker bit is set at bit 5 of the 17-bit register, and hence a range of events is selected, wherein bits 16-6 in the register define the 11 most significant bits of the base event with 5 trailing zeros. All events from bbbb_bbbb_bbb0__0000 to bbbb_bbbb_bbb1__1111 are then selected, i.e. a base event and 31 sequentially following events are selected.

FIG. 3C illustrates a situation in which all events are selected. This is determined by bit 16 of the 17-bit register being set. This means that no bits of the identifier selection register are used and the base event is 0000__0000__0000__0000 followed by $2^{16}-1$ following events, i.e. all $2^{16}$ possible events are selected.

Figure 4:
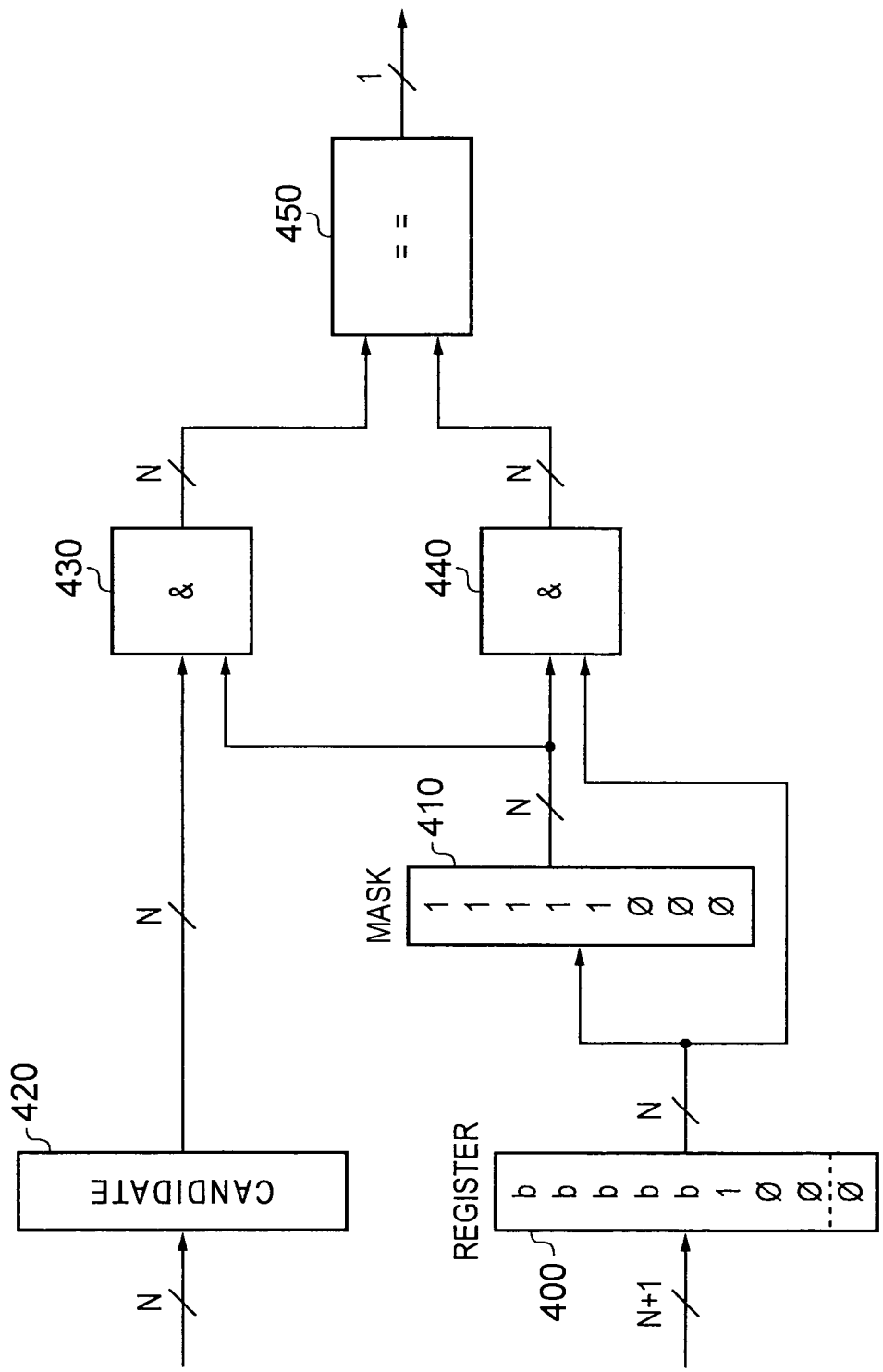
FIG. 4 schematically illustrates circuitry for identifying if a candidate identifier is within a predefined range.

FIG. 4 schematically illustrates example circuitry by means of which the techniques of the present invention may be implemented. A bit pattern stored in register 400 determines the subset of selected identifiers that will be selected. In this example an 8-bit addressing is used, such that $2^8$ identifiers are possible and hence register 400 comprises 9 bits. As illustrated in register 400, bit 3 of the identifier selection bits is set, so that $2^3$ selected identifiers will be selected. An 8-bit mask 410 is created from the contents of register 400, by ignoring bit zero and representing any bit above the marker bit as a one. An N-bit candidate identifier 420 is subjected to a bit-wise AND operation with mask 410 in bit-wise AND unit 430, whilst the N most significant bits in register 400 are also subjected to a bit-wise AND operation with mask 410 in bit-wise AND unit 440. The results of the 2 bit-wise AND operations are then compared in comparator 450, giving a result of one if the candidate identifier falls within the specified range and zero if it does not.

Figure 5:
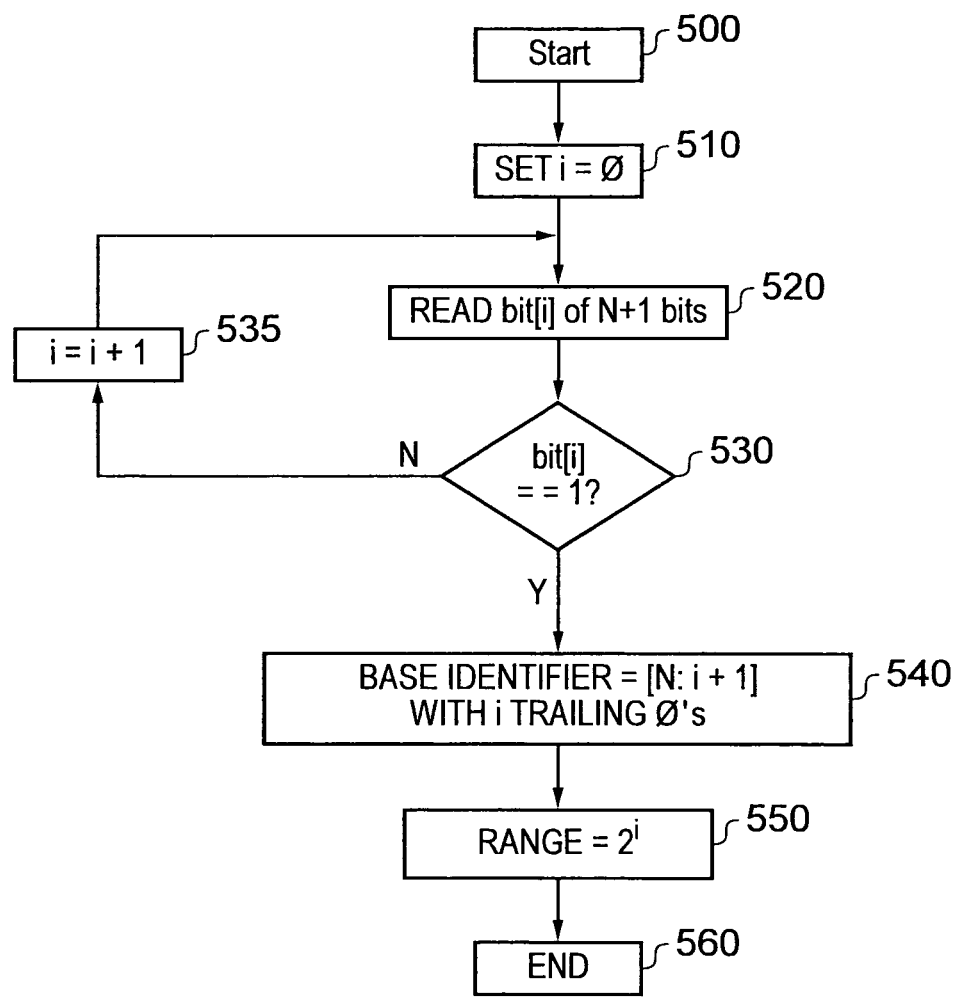
FIG. 5 schematically illustrates a process of determining $2^M$ selected identifiers within a possible range of up to $2^N$ identifiers where M is than or equal to N.

FIG. 5 schematically illustrates an example process of determining a selection of identifiers from N+1 identifier selection bits. The flow starts at step 500 and proceeds to step 510 where the variable i is set to zero. At step 520 bit i of the N+1 identifier selection bits is read. If at step 530 it is determined that the value at this bit location is not equal to 1 then at step 535 i is incremented by 1 and the flow returns to step 520. If however bit i is found to be equal to 1 at step 530, then at step 540 a base identifier is constructed from bits N to i+1 of the N+1 identifier selection bits with i trailing zeros appended. This defines the base identifier and the range is then determined at step 550, given by $2^i$. The flow ends at 560.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus configured to select $2^M$ selected identifiers within a possible range of up to $2^N$ identifiers, where $M \leq N$, said data processing apparatus comprising:

a selection storage unit configured to store N+1 identifier selection bits, wherein a position of a marker bit in said N+1 identifier selection bits determines M; and an identifier selection unit configured to determine said $2^M$ selected identifiers, wherein said $2^M$ selected identifiers are defined by a base identifier and $2^M-1$ identifiers incrementally following said base identifier, wherein N−M bits of said N+1 identifier selection bits form N−M most significant bits of said base identifier, and M trailing zeroes form M least significant bits of said base identifier.

2. A data processing apparatus as claimed in claim 1, wherein said N−M bits of said N+1 identifier selection bits comprise N−M most significant bits of said N+1 identifier selection bits.

3. A data processing apparatus as claimed in claim 1, wherein said marker bit is stored at bit M of said N+1 identifier selection bits.

4. A data processing apparatus as claimed in claim 1, wherein said data processing apparatus comprises a tracing unit configured to provide trace information indicative of activity of a processor core.

5. A data processing apparatus as claimed in claim 4, wherein said up to $2^N$ identifiers comprise channels via which said processor core is configured to pass said trace information to said tracing unit.

6. A data processing apparatus as claimed in claim 1, wherein said up to $2^N$ identifiers are a range of address locations.

7. A data processing apparatus as claimed in claim 6, wherein said data processing apparatus comprises an address monitoring unit configured to monitor use of said range of address locations.

8. A data processing apparatus as claimed in claim 7, wherein said range of address locations is a range of addresses of bytes of memory.

9. A data processing apparatus as claimed in claim 7, wherein said range of address locations is a range of addresses of words of memory.

10. A data processing apparatus as claimed in claim 6, wherein said address monitoring unit is a watchpoint unit in a processor core.

11. A data processing apparatus as claimed in claim 1, wherein said data processing apparatus comprises a bus transaction monitoring unit configured to monitor use of a range of bus transaction identifiers, and wherein said up to $2^N$ identifiers comprise said range of bus transaction identifiers.

12. A data processing apparatus as claimed in claim 1, wherein said selection storage unit comprises an N+1 bit register.

13. A data processing apparatus as claimed in claim 1, wherein said marker bit comprises a logical 1.

14. A data processing apparatus as claimed in claim 1, wherein said marker bit comprises a logical 0.

15. A data processing apparatus as claimed in claim 1, wherein said data processing apparatus is configured to identify said marker bit at a least significant bit position of said N+1 identifier selection bits in which a predetermined value is stored.

16. A data processing apparatus as claimed in claim 1, wherein said data processing apparatus comprises a mask generator, two bit-wise AND units and a comparator configured to compare the output of said two bit-wise AND units.

17. A data processing apparatus as claimed in claim 16, wherein said mask generator is configured to generate a N-bit mask value from said N+1 identifier selection bits and a first bit-wise AND unit is configured to perform a bit-wise AND operation on said N-bit mask value and N bits of said N+1 identifier selection bits.

18. A data processing apparatus as claimed in claim 17, wherein a second bit-wise AND unit is configured to perform a bit-wise AND operation on said N-bit mask value and an N-bit candidate identifier.

19. A data processing apparatus configured to select $2^M$ selected identifiers within a possible range of up to $2^N$ identifiers, where M≦N, said data processing apparatus comprising:

selection storage means for storing N+1 identifier selection bits, wherein a position of a marker bit in said N+1 identifier selection bits determines M; and identifier selection means for determining said $2^M$ selected identifiers, wherein said $2^M$ selected identifiers are defined by a base identifier and $2^m-1$ identifiers incrementally following said base identifier, wherein N−M bits of said N+1 identifier selection bits form N−M most significant bits of said base identifier, and M trailing zeroes form M least significant bits of said base identifier.

20. A method of selecting $2^M$ selected identifiers within a possible range of up to $2^N$ identifiers, where M≦N, said method comprising the steps of:

providing N+1 identifier selection bits;

setting a marker bit at a position in said N+1 identifier selection bits to determine M; and reading said N+1 identifier selection bits, wherein said $2^M$ selected identifiers are defined by a base identifier and $2^m-1$ identifiers incrementally following said base identifier, wherein N−M bits of said N+1 identifier selection bits form N−M most significant bits of said base identifier, and M trailing zeroes form M least significant bits of said base identifier, wherein said method steps are implemented on a data processor.

* * * * *